US012573225B2

(12) United States Patent
Semenov et al.

(10) Patent No.: US 12,573,225 B2
(45) Date of Patent: *Mar. 10, 2026

(54) METHODS AND SYSTEMS OF FIELD DETECTION IN A DOCUMENT

(71) Applicant: ABBYY Development Inc., Dover, DE (US)

(72) Inventors: Stanislav Semenov, Moscow (RU); Mikhail Lanin, Moscow (RU)

(73) Assignee: ABBYY Development Inc., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/506,681

(22) Filed: Nov. 10, 2023

(65) Prior Publication Data

US 2024/0078826 A1 Mar. 7, 2024

Related U.S. Application Data

(63) Continuation of application No. 17/129,906, filed on Dec. 21, 2020, now Pat. No. 11,861,925.

(30) Foreign Application Priority Data

Dec. 17, 2020 (RU) ........................... RU2020141790

(51) Int. Cl.
*G06V 30/412* (2022.01)
*G06F 18/214* (2023.01)
(Continued)

(52) U.S. Cl.
CPC .......... *G06V 30/412* (2022.01); *G06F 18/214* (2023.01); *G06F 40/284* (2020.01); *G06V 30/414* (2022.01)

(58) Field of Classification Search
CPC ........ G06N 3/08; G06N 3/0454; G06V 10/82; G06V 30/10; G06V 30/413; G06V 10/40;
(Continued)

(56) References Cited

U.S. PATENT DOCUMENTS 5,638,491 A 6/1997 Moed
6,886,136 B1 4/2005 Zlotnick et al.
(Continued)

FOREIGN PATENT DOCUMENTS

CN 106649853 A 5/2017
CN 106654853 A 5/2017
(Continued)

OTHER PUBLICATIONS

ProvisionalSpecificationofU.S. Appl. No. 62/983,302, filed Feb. 28, 2020;Guptaet.al;pp. 1-10 (Year: 2020).*
(Continued)

*Primary Examiner* — Michael J Vanchy, Jr.
(74) *Attorney, Agent, or Firm* — Lowenstein Sandler LLP

(57) ABSTRACT

Systems and methods are disclosed to receive a training data set comprising a plurality of document images, wherein each document image of the plurality of document images is associated with respective metadata identifying a document field containing a variable text; generate, by processing the plurality of document images, a first heat map represented by a data structure comprising a plurality of heat map elements corresponding to a plurality of document image pixels, wherein each heat map element stores a counter of a number of document images in which the document field contains a document image pixel associated with the heat map element; receive an input document image; and identify, within the input document image, a candidate region comprising the document field, wherein the candidate region comprises a plurality of input document image pixels cor- (Continued)

responding to heat map elements satisfying a threshold condition.

20 Claims, 9 Drawing Sheets

(51) Int. Cl.
*G06F 40/284* (2020.01)
*G06V 30/414* (2022.01)

(58) Field of Classification Search
CPC .. G06V 30/153; G06V 30/412; G06V 30/414;
G06V 2201/10; G06F 17/16; G06F
40/131; G06F 40/183; G06F 40/216;
G06F 40/242; G06F 40/279; G06F
40/284; G06F 40/30; G06K 9/6262;
G06K 9/627; G06K 9/6272; G06K
9/6256
See application file for complete search history.

(56) References Cited

U.S. PATENT DOCUMENTS

| | | | |
|---|---|---|---|
| 7,370,034 B2 | 5/2008 | Franciosa et al. | |
| 8,265,925 B2 | 9/2012 | Aarskog | |
| 8,595,235 B1 | 11/2013 | Sampson et al. | |
| 8,726,148 B1 | 5/2014 | Battilana | |
| 8,923,618 B2 | 12/2014 | Kutsumi | |
| 9,613,299 B2 | 4/2017 | Krivosheev et al. | |
| 10,013,643 B2 | 7/2018 | Yellapragada et al. | |
| 10,360,507 B2 | 7/2019 | Aravamudan et al. | |
| 10,467,464 B2 | 11/2019 | Chen et al. | |
| 10,558,712 B2 | 2/2020 | Zholudev et al. | |
| 10,679,085 B2 | 6/2020 | Li et al. | |
| 10,872,236 B1 | 12/2020 | Elor et al. | |
| 10,936,863 B2 * | 3/2021 | Simantov | G06N 3/08 |
| 11,074,442 B2 | 7/2021 | Semenov | |
| 11,861,925 B2 * | 1/2024 | Semenov | G06F 40/30 |
| 2006/0242610 A1 | 10/2006 | Aggarwal | |
| 2007/0244915 A1 | 10/2007 | Cha et al. | |
| 2008/0077572 A1 | 3/2008 | Boyle et al. | |
| 2009/0210406 A1 | 8/2009 | Freire et al. | |
| 2011/0093464 A1 | 4/2011 | Cvet et al. | |
| 2013/0262465 A1 | 10/2013 | Galle et al. | |
| 2015/0112874 A1 | 4/2015 | Serio et al. | |
| 2016/0004667 A1 | 1/2016 | Chakerian et al. | |
| 2016/0148074 A1 | 5/2016 | Jean et al. | |
| 2016/0171627 A1 | 6/2016 | Lyubarskiy | |
| 2017/0061250 A1 | 3/2017 | Gao et al. | |
| 2017/0351781 A1 | 12/2017 | Alexander et al. | |
| 2018/0181808 A1 | 6/2018 | Sridharan | |
| 2018/0285448 A1 | 10/2018 | Chia et al. | |
| 2018/0349743 A1 | 12/2018 | Iurii | |
| 2019/0019503 A1 | 1/2019 | Henry | |
| 2019/0180094 A1 | 6/2019 | Zagaynov et al. | |
| 2019/0180154 A1 | 6/2019 | Orlov et al. | |
| 2019/0205451 A1 | 7/2019 | Alipov et al. | |
| 2019/0266394 A1 | 8/2019 | Yu et al. | |
| 2019/0294874 A1 | 9/2019 | Orlov et al. | |
| 2019/0294921 A1 | 9/2019 | Kalenkov | |
| 2019/0311194 A1 | 10/2019 | Zhuravlev | |
| 2019/0361972 A1 | 11/2019 | Lin | |
| 2019/0385001 A1 | 12/2019 | Stark | |
| 2020/0327351 A1 | 10/2020 | Abedini et al. | |
| 2020/0327360 A1 | 10/2020 | Samala | |
| 2020/0364451 A1 | 11/2020 | Ammar et al. | |
| 2021/0012102 A1 | 1/2021 | Cristescu et al. | |
| 2021/0019512 A1 | 1/2021 | Uppal et al. | |

| | | | |
|---|---|---|---|
| 2021/0034853 A1 | 2/2021 | Matsumoto et al. | |
| 2021/0064861 A1 | 3/2021 | Semenov | |
| 2021/0064908 A1 | 3/2021 | Semenov | |
| 2021/0124919 A1 | 4/2021 | Balakrishnan et al. | |
| 2021/0149993 A1 * | 5/2021 | Torres | G06N 3/045 |
| 2021/0150338 A1 | 5/2021 | Semenov | |
| 2021/0165964 A1 | 6/2021 | Jones | |
| 2021/0182328 A1 | 6/2021 | Rollings et al. | |
| 2021/0201013 A1 | 7/2021 | Makhija et al. | |
| 2021/0271872 A1 * | 9/2021 | Gupta | G06N 3/0442 |
| 2021/0295103 A1 | 9/2021 | Tanniru et al. | |

FOREIGN PATENT DOCUMENTS

| | | |
|---|---|---|
| CN | 107168955 A | 9/2017 |
| CN | 107168955 B | 6/2019 |
| EP | 3437019 B1 | 9/2020 |
| RU | 2556425 C1 | 7/2015 |
| RU | 2661750 C1 | 7/2018 |
| RU | 2668717 C1 | 10/2018 |
| RU | 2679209 C2 | 2/2019 |
| RU | 2691214 C1 | 6/2019 |
| RU | 2693332 C1 | 7/2019 |
| RU | 2693916 C1 | 7/2019 |
| RU | 2737720 C1 | 12/2020 |
| WO | 2013135474 A1 | 9/2013 |
| WO | 2018126325 A1 | 7/2018 |

OTHER PUBLICATIONS

Katti A.R., et al., "Applying Sequence-to-Mask Models for Information Extraction from Invoices," DAS 2018 Short Papers Booklet , 13th IAPR International Workshop on Document Analysis Systems, Vienna, Austria, Apr. 24-27, 2018, pp. 9-10, 04 Pages.

Ma E., "3 Subword Algorithms Help to Improve Your NLP Model Performance," Introduction to subword, May 18, 2019, pp. 1-7, Retrieved from URL: https://medium.com/@makcedward/how-subword-helps-on-your-nlp-model-83dd1b836f46.

Mozharova V A., et al., "Investigation of Features for Extraction of Named Entities From Texts in Russian," 2017, 2 Pages, Retrieved from URL: https://patents.google.com/scholar/16285686872319998042?q=text+field+entry+word+extraction+detectionconnection+key+hyphotesys+learning&scholar&oq=text+field+entry+word+extraction+detection+connection+keyi-hyphotesys+learning.

Palm R.B., et al., "CloudScan—A Configuration-Free Invoice Analysis System Using Recurrent Neural Networks," IEEE, 2017 14th IAPR International Conference on Document Analysis and Recognition (ICDAR), arXiv: 1708.07403v1 [cs.CL], Aug. 24, 2017, 08 Pages.

Raoui-Outach R., et al., "Deep Learning for Automatic Sale Receipt Understanding," IEEE, arXiv: 1712.01606v1 [cs.CV], Dec. 5, 2017, 08 Pages.

Sandhan J., et al., "Revisiting the Role of Feature Engineering for Compound Type Identification in Sanskrit," Indian Institute of Technology, Kanpur, UP, India, 17 Pages, Retrieved from URL: https://www.aclweb.org/anthology/W19-7503.pdf.

Zuyev K., et al., "Text Field Detection Using Neural Networks," U.S. Appl. No. 16/017,683, filed Jun. 25, 2018, 57 Pages.

Forsati R., et al., "Efficient Stochastic Algorithms for Document Clustering," Information Sciences, 2012, 21 Pages.

Maher K., et al., "Effectiveness of Different Similarity Measures for Text Classification and Clustering," International Journal of Computer Science and Information Technologies, 2016, vol. 7(4), pp. 1715-1720.

Rashad M. A., et al., "Document Classification Using Enhanced Grid Based Clustering Algorithm," Springer International Publishing, 2015, pp. 207-215.

* cited by examiner

401

402

600 detected
fields 610 detected
fields

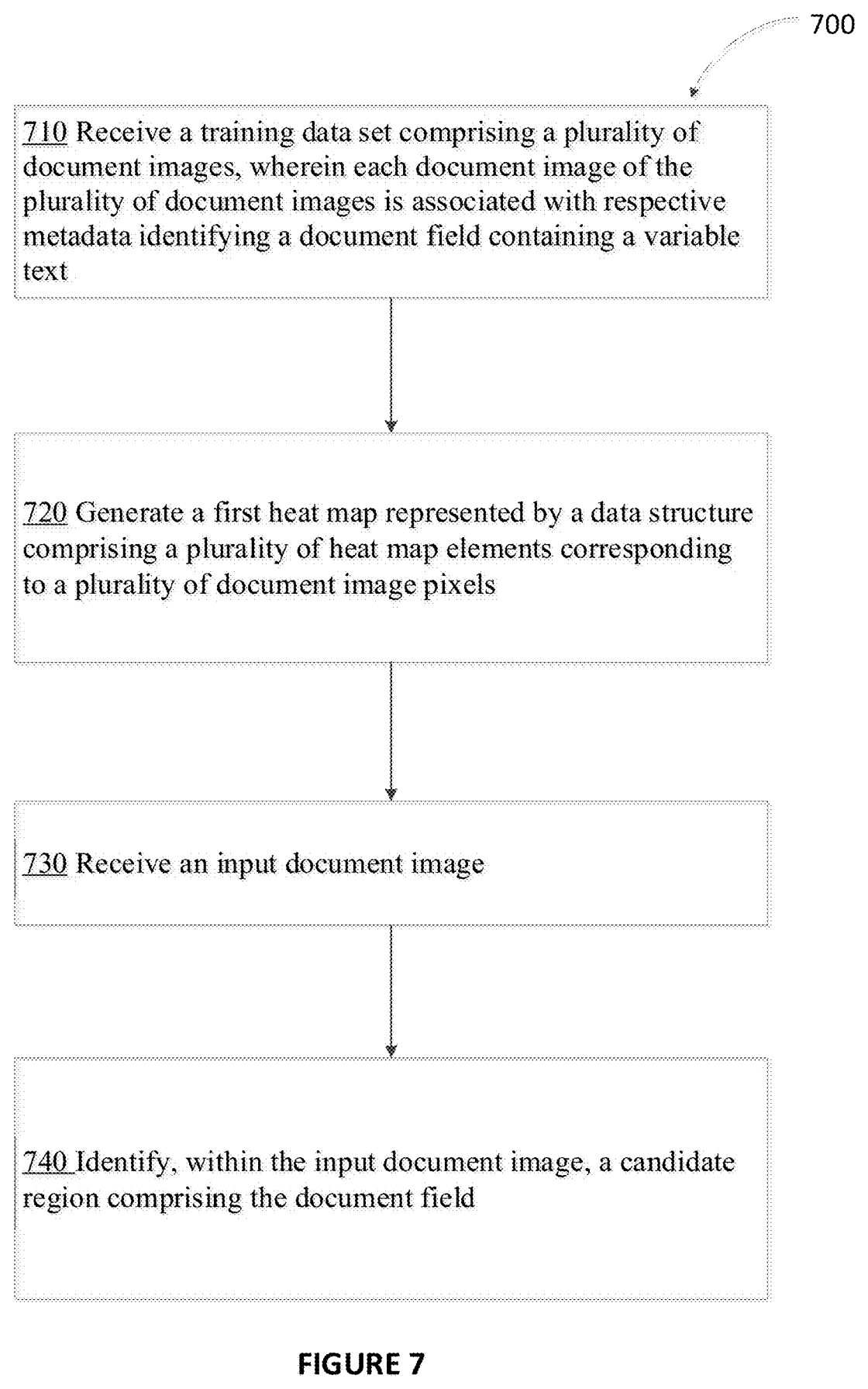

700

710 Receive a training data set comprising a plurality of document images, wherein each document image of the plurality of document images is associated with respective metadata identifying a document field containing a variable text 720 Generate a first heat map represented by a data structure comprising a plurality of heat map elements corresponding to a plurality of document image pixels 730 Receive an input document image 740 Identify, within the input document image, a candidate region comprising the document field

FIGURE 7

METHODS AND SYSTEMS OF FIELD DETECTION IN A DOCUMENT

RELATED APPLICATIONS

This application is a continuation of U.S. patent application Ser. No. 17/129,906, filed Dec. 21, 2020, which claims priority under 35 USC § 119 to Russian patent application No. 2020141790, filed Dec. 17, 2020. Both above-referenced applications are incorporated by reference herein.

TECHNICAL FIELD

The present disclosure is generally related to computer systems, and is more specifically related to systems and methods for detecting fields on a document.

BACKGROUND

An image may depict a document or a part of a document. The document may consist of various types of elements, including fields. An image processing engine may be tasked with detecting fields within an image of a document.

SUMMARY OF THE DISCLOSURE

In accordance with one or more aspects of the present disclosure, an example method may comprise: receiving a training data set comprising a plurality of document images, wherein each document image of the plurality of document images is associated with respective metadata identifying a document field containing a variable text; generating, by processing the plurality of document images, a first heat map represented by a data structure comprising a plurality of heat map elements corresponding to a plurality of document image pixels, wherein each heat map element stores a counter of a number of document images in which the document field contains a document image pixel associated with the heat map element; receiving an input document image; and identifying, within the input document image, a candidate region comprising the document field, wherein the candidate region comprises a plurality of input document image pixels corresponding to heat map elements satisfying a threshold condition.

In accordance with one or more aspects of the present disclosure, an example system may comprise: a memory device storing instructions; a processing device coupled to the memory device, the processing device to execute the instructions to: receive a training data set comprising a plurality of document images, wherein each document image of the plurality of document images is associated with respective metadata identifying a document field containing a variable text; generate, by processing the plurality of document images, a first heat map represented by a data structure comprising a plurality of heat map elements corresponding to a plurality of document image pixels, wherein each heat map element stores a counter of a number of document images in which the document field contains a document image pixel associated with the heat map element; receive an input document image; and identify, within the input document image, a candidate region comprising the document field, wherein the candidate region comprises a plurality of input document image pixels corresponding to heat map elements satisfying a threshold condition.

In accordance with one or more aspects of the present disclosure, an example non-transitory computer-readable storage medium may comprise instructions that, when executed by a processing device, cause the processing device to: receive a training data set comprising a plurality of document images, wherein each document image of the plurality of document images is associated with respective metadata identifying a document field containing a variable text; generate, by processing the plurality of document images, a first heat map represented by a data structure comprising a plurality of heat map elements corresponding to a plurality of document image pixels, wherein each heat map element stores a counter of a number of document images in which the document field contains a document image pixel associated with the heat map element; receive an input document image; and identify, within the input document image, a candidate region comprising the document field, wherein the candidate region comprises a plurality of input document image pixels corresponding to heat map elements satisfying a threshold condition.

In accordance with one or more aspects of the present disclosure, an example method may comprise: receiving a training data set comprising a plurality of documents, wherein each document of the plurality of documents is associated with a plurality of user marked field; for a given field of the plurality of user marked fields in a given document of the plurality of documents, determining whether a particular combination, existing on the given document, of relative positions of additional one or more user marked fields relative to the given field is repeated on one or more additional documents; responsive to determining that the particular combination is not repeated on any additional documents, designating the given field as being marked incorrectly; and responsive to determining that the particular combination is repeated on one or more additional documents, determining whether a different combination of relative positions of the additional one or more user marked fields relative to the given field exists on two or more other documents, wherein: responsive to determining that the different combination does not exist on two or more other documents, designating the given field as being marked correctly; and responsive to determining that the different combination exists on two or more other documents, designating the given field as being marked inconsistently.

BRIEF DESCRIPTION OF THE DRAWINGS

The present disclosure is illustrated by way of example, and not by way of limitation, and can be more fully understood with reference to the following detailed description when considered in connection with the figures in which:

FIG. 7 depicts a flow diagram of an example method for detecting fields in a document, in accordance with one or more aspects of the present disclosure.

DETAILED DESCRIPTION

Figure 1:
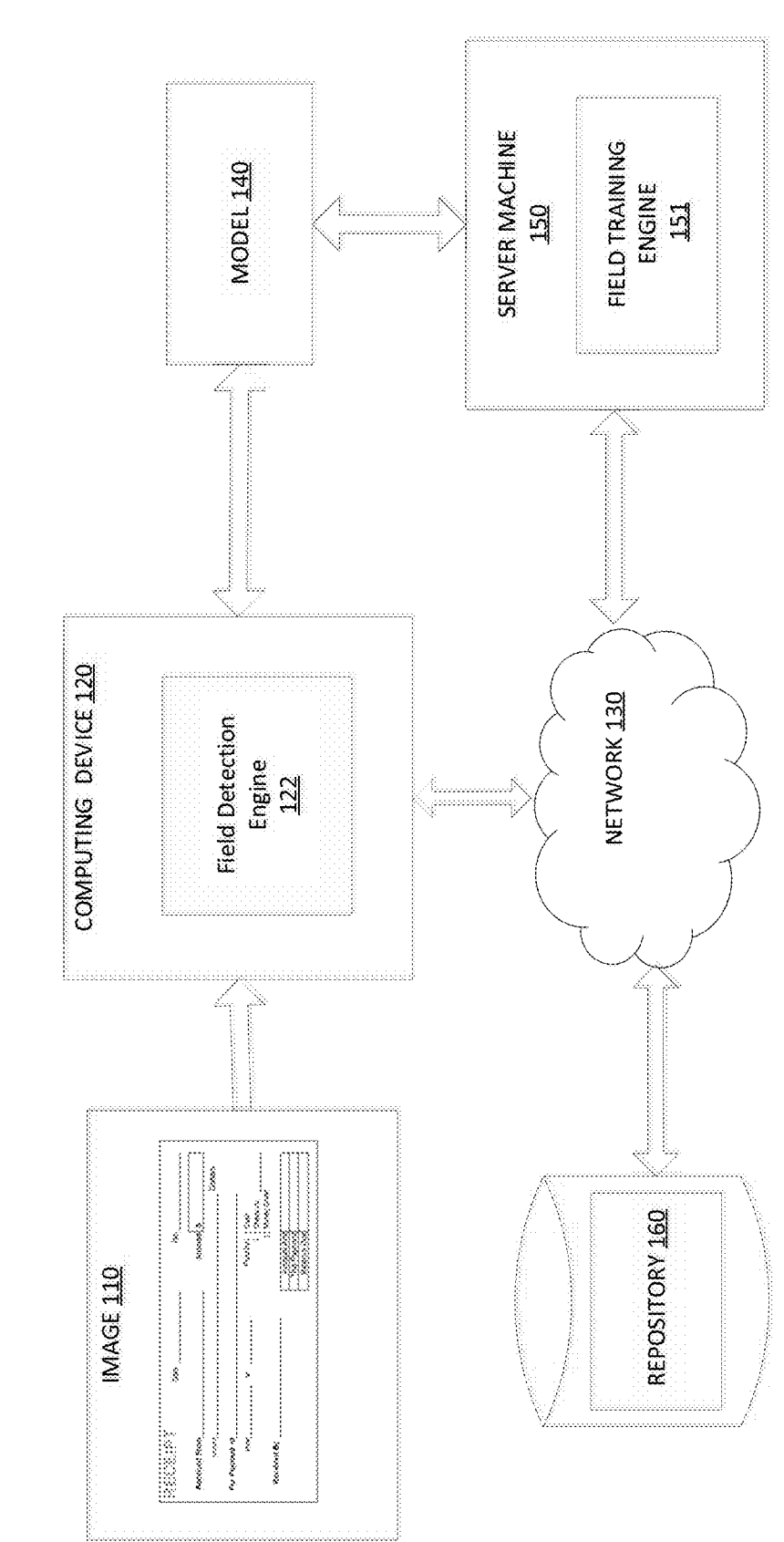
FIG. 1 depicts a high-level component diagram of an illustrative system architecture, in accordance with one or more aspects of the present disclosure.

Implementations for document field detection are described. A "field" refers to an area within a document (e.g., a rectangular area), such that the area is designated as a placeholder in which variable data can be populated, thus creating a new instance of the document type (e.g., an invoice, an order, etc.). Fields are typically found in form documents. A document may have variety of fields, such as text fields (containing numerals, numbers, letters, words, sentences), graphics fields (containing a logo or any other image), tables (having rows, columns, cells), and so on.

As used herein, "electronic document" (also referred to simply as "document" herein) may refer to any document whose image may be accessible to a computing system. The image may be a scanned image, a photographed image, or any other representation of a document that is capable of being converted into a data form accessible to a computer. For example, "electronic document" may refer to a file comprising one or more digital content items that may be visually rendered to provide a visual representation of the electronic document (e.g., on a display or a printed material). In accordance with various implementations of the present disclosure, a document may conform to any suitable electronic file format, such as PDF, DOC, ODT, JPEG, etc.

"Document" may represent a financial document, a legal document, or any other document, e.g., a document that is produced by populating fields with alphanumeric symbols (e.g., letters, words, numerals) or images. "Document" may represent a document that is printed, typed, or handwritten (for example, by filling out a standard form). "Document" may represent a form document that has a variety of fields, such as text fields (containing numerals, numbers, letters, words, sentences), graphics field (containing a logo or any other image), tables (having rows, columns, cells), and so on. Examples of different types of documents that has fields include contracts, invoices, financial documents, business cards, personal identification documents, loan applications, order/discharge documents, accounting documents, reporting documents, patent search reports, various company forms, etc.

Fields can be found in various types of documents, such as, invoices, financial documents, business cards, personal identification documents, loan applications, etc. Optical character recognition (OCR) of such a document may involve a preliminary step of identifying all the field contained by the document, which may be performed by neural networks that are trained on a large number of (e.g., thousands) sample documents that include fields. However, such approach does not provide field detection with adequate accuracy across different types of documents using universal sample documents because the documents may differ significantly. Thus, a large number of each type of sample documents may be needed for training the neural networks. Such methods of field detection require long term, extensive training with many manual operations, lack flexibility, pose a potential for disclosure of confidential data. Moreover, these methods also require accurate markup of each document. However, when manual operations are involved to mark up the documents, the human users often omit or incorrectly mark the fields, thus rendering the documents not suitable for being utilized as training samples. Additionally, to mitigate these incorrect markups, the user may have to redo the mark up or mark up additional documents of the same type to start the training again. In some cases, the user also is not able to perform the mark up correctly because the user may not know where a particular field is located on the document, or the field is not identified with a descriptive word. For example, a user may intend to mark up the "total" field that is expected to be populated with a number. However, if the field is not identified with the word "total," or the user cannot locate the word "total," or for other reasons, the user can instead mark up another field containing characters that are visually similar to the expected content of the "total" field, such as, another field containing numbers.

Aspects of this disclosure address the above noted and other deficiencies by providing mechanisms for field detection in a document without the need to manually markup an extensive number of documents for training the neural network. The mechanisms can provide for rapid training of a trainable model on a small data set, such as a data set including no more than ten documents of a specific type with marked up fields. Upon training a model for a specific class of documents, the model is used to detect the fields in other user documents of the same class of documents.

In one embodiment, aspects of the disclosure provide for training the neural network using a small number of marked-up documents to be used as training documents. These documents may have metadata that identifies one or more document fields based on user markup that indicates location of the respective document fields. The field detection is based on identifying spatial distributions of fields with respect to visual reference elements within the training documents. After images of the documents are received, text from the document images are obtained and various characters, including words, are obtained from the text in the document images. Reference elements on a document image can be used to define the location of the marked up fields. Any structural element that belongs to the document layout can be used as reference element. A reference element can include predefined visual elements, such as, a predefined word (e.g., keywords, custom dictionary words), a predefined graphical element (e.g., a visual divider, a logo) etc. on the document images. Reference elements on the document images can be identified by matching words from a custom dictionary, and/or words that appear on a given document (or in the corpus of the documents) with a frequency that exceeds a predefined threshold frequency. For example, an invoice may include Company Name, Total, Due Date, etc. for reference elements based on the frequency at which these keywords may appear on these types of documents. Locations of various document fields can be defined relative to the reference element.

For each field in the training data set, a heat map can be generated with respect to each reference element. "Heat map" refers to a set of numeric elements, such that the value of each element is defined by a certain function computed at the image coordinates reflecting the position of the element. In some implementations, the heat map may be represented by a rectangular matrix, each element of which corresponds to a certain pixel in the vicinity of a reference element, such that the value associated with each pixel reflects the number of training documents in which the given field contains this pixel. The numeric values of heat map elements can be color coded for visualization (hence, the term), however, this step would be superfluous for neural network training, in which the numeric values, rather than colors, are used.

Accordingly, the training phase may involve generating the heat maps of a relatively small set of training documents that are accompanied by metadata ("mark-up") indicating the positions and names of the document fields. The generated heat maps may then be used for identifying the field positions in other documents. In some implementations, a system operating in accordance with aspects of the present disclosure may identify, within the input document image, a candidate region for each field of interest, based on the heat maps built for this field with respect to one or more reference elements. Each identified candidate region would include the input document image pixels corresponding to heat map elements satisfying a threshold condition (e.g., having their respective values exceeding a threshold, selecting a predefined share of pixels having the largest values, etc).

The selected candidate regions may then be treated as the positions of the corresponding fields, i.e., by applying OCR techniques to the image fragments lying within the candidate regions. In some implementations, the extracted content of each document field can be evaluated using BPE (Byte Pair Encoding) tokens, by evaluating the differences (e.g., Euclidian distances) between the BPE token representing the extracted content of a given field of the input document and the BPE tokens computed for the same field in the training documents BPE token refers to a numeric vector representing an input text. In some implementations, the vector can be represented by an embedding of an interim representation of the input text, such that the interim representation may utilize an artificial alphabet, each symbol of which can encode a substring of one or more characters of the input text, as described in more detail herein below. The embeddings are generated in such a manner that semantically close inputs would produce numerically close embeddings.

Accordingly, if the computed distance between the BPE token representing the content extracted from a candidate field and the BPE token(s) representing the same field in the training data set is less than a threshold, the likelihood that the field is detected correctly is relatively high, and the candidate field may be accepted for information extraction. The techniques described herein allow for automatic field detection in documents using artificial intelligence. The systems and methods described herein represent significant improvements in producing more accurate and efficient field detection in documents. The methods utilize trainable models which can be trained on a small number (e.g., less than ten) of sample documents, detect and classify fields with high quality. The methods make it possible to speed up and improve quality of data validation. In addition, the methods can also provide guidance to human users if the user might have marked up a field inaccurately or missed marking up a field. The methods allow for identification of erroneous document markup performed by human users, and correction and restoration of missing markup of fields in an effective way. Additionally, the methods allow to select subset of marked-up documents that contain complete and consistent markup that can in turn allow for training additional, more accurate models.

Various aspects of the above referenced methods and systems are described in details herein below by way of examples, rather than by way of limitation.

FIG. 1 depicts a high-level component diagram of an illustrative system architecture 100, in accordance with one or more aspects of the present disclosure. System architecture 100 includes a computing device 120, a repository 160, and a server machine 150 connected to a network 130. Network 130 may be a public network (e.g., the Internet), a private network (e.g., a local area network (LAN) or wide area network (WAN)), or a combination thereof.

The computing device 120 may perform field detection on a document image. In one embodiment, computing device 120 may be a desktop computer, a laptop computer, a smartphone, a tablet computer, a server, a scanner, or any suitable computing device capable of performing the techniques described herein. Computing device 120 may receive one or more images. In an example, image 110 may be received by the computing device 120. Image 110 may include an image of a document, a document page, or a part of a document page. The document page or the part of the document page depicted in image 110 may include one or more fields with variable text. In an example, various document fields within the document may need to be detected. Image 110 may be provided as an input to computing device 120.

In one embodiment, computing device 120 may include a field detection engine 122. The field detection engine 122 may include instructions stored on one or more tangible, machine-readable storage media of the computing device 120 and executable by one or more processing devices of the computing device 120. In one embodiment, field detection engine 122 may generate as output a number of detected fields, content extracted from the detected fields, and/or an output document with a number of detected fields and content corresponding to the detected fields. In one embodiment, field detection engine 122 may use a trained machine learning model 140 that is trained to detect fields within image 110. The machine learning model 140 may be trained using training set of images. In some instances, the machine learning model 140 may be part of the field detection engine 122 or may be accessed on another machine (e.g., server machine 150) by the field detection engine 122. Based on the output (e.g., heat maps corresponding to pixels of the image) of the trained machine learning model 140, field detection engine 122 may identify a candidate region in the input image 110 that is detected as a particular field. The field detection engine 122 may also extract words belonging to the detected field.

Server machine 150 may be a rackmount server, a router computer, a personal computer, a portable digital assistant, a mobile phone, a laptop computer, a tablet computer, a camera, a video camera, a netbook, a desktop computer, a media center, or any combination of the above. The server machine 150 may include a field training engine 151. The machine learning model 140 may refer to model artifacts that are created by the field training engine 151 using the training data that includes training inputs and corresponding target outputs (correct answers for respective training inputs). During training, patterns in the training data that map the training input to the target output (the answer to be predicted) can be found, and are subsequently used by the machine learning model 140 for future predictions. As described in more detail below, the machine learning model 140 may be composed of, e.g., a single level of linear or non-linear operations (e.g., a support vector machine [SVM]) or may be a deep network, i.e., a machine learning model that is composed of multiple levels of non-linear operations). Examples of deep networks are neural networks including convolutional neural networks, recurrent neural networks with one or more hidden layers, and fully connected neural networks.

The machine learning model 140 may be trained to determine the probability of pixels of images belonging to a specified document field, as further described below. Once the machine learning model 140 is trained, the machine learning model 140 can be provided to field detection engine 122 for analysis of image 110. For example, the field detection engine 122 may request heat maps for a number of keywords in the image 110. In some examples, model 140 may consist of a convolutional neural network. The field detection engine 122 may obtain one or more outputs from the trained machine learning model 140. The output may be a set of hypotheses for a document field location based on heat maps.

The repository 160 may be a persistent storage that is capable of storing image 110, heat maps, reference elements and points, document field hypotheses, detected fields and output images, as well as data structures to tag, organize, and index the image 110. Repository 160 may be hosted by one or more storage devices, such as main memory, magnetic or optical storage based disks, tapes or hard drives, NAS, SAN, and so forth. Although depicted as separate from the computing device 120, in an implementation, the repository 160 may be part of the computing device 120. In some implementations, repository 160 may be a network-attached file server, while in other embodiments, repository 160 may be some other type of persistent storage such as an object-oriented database, a relational database, and so forth, that may be hosted by a server machine or one or more different machines coupled to the via the network 130.

Figure 2:
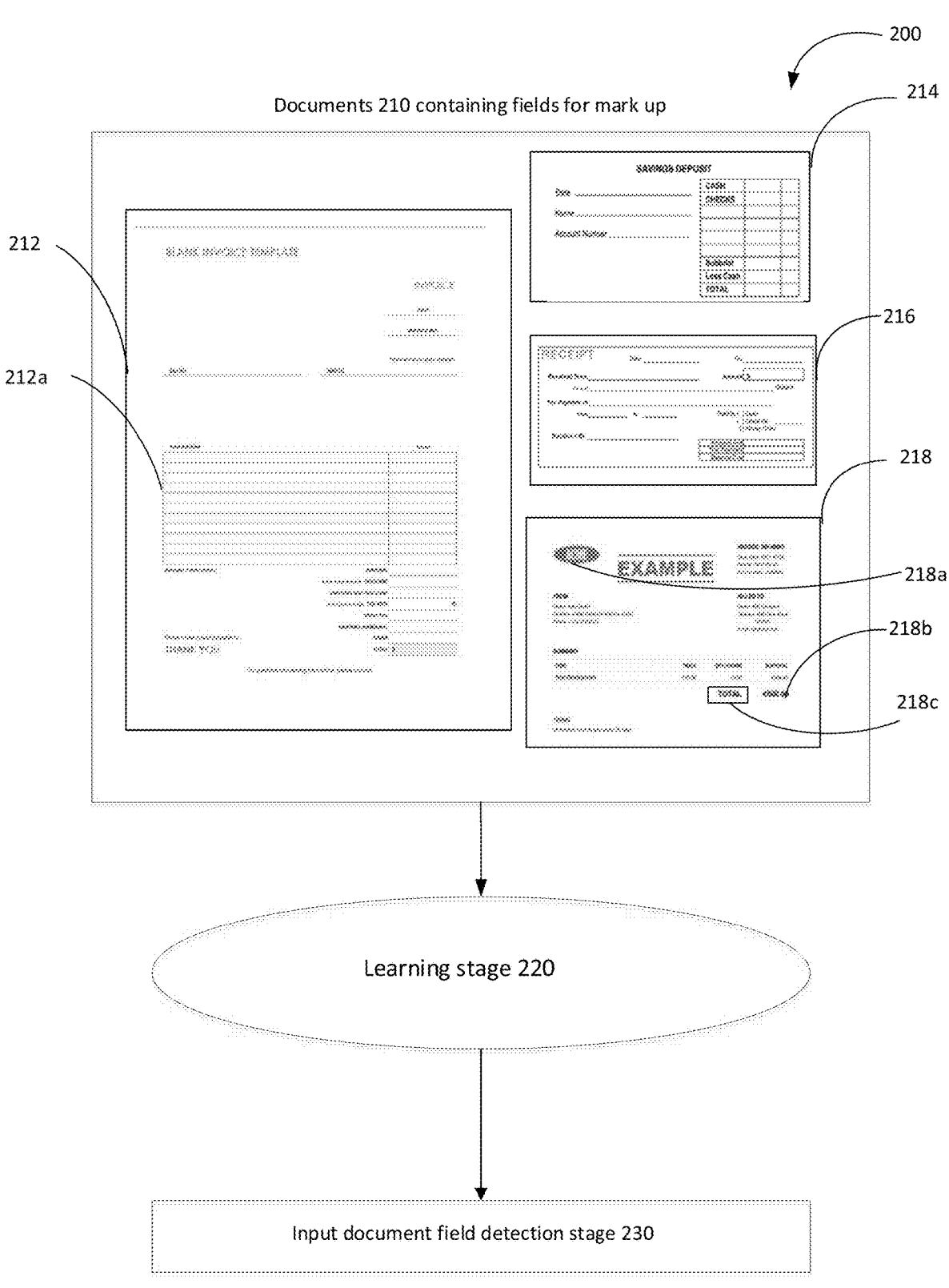
FIG. 2 depicts a high level flow diagram of an example method for field detection in a document, in accordance with one or more aspects of the present disclosure.

FIG. 2 depicts a high level flow diagram of an example method 200 for field detection in a document, in accordance with one or more aspects of the present disclosure. From a high level, the operation of the system can be logically divided in 2 stages. The first stage is the learning stage 220, and the second stage is input document field detection stage 230. The learning stage 220 can receive as input various documents 210 containing various fields. In the example of FIG. 2, documents 210 include a bank invoice template 212, a savings deposit 214, a receipt 216, an invoice 218, etc. Each of the documents 210 contain multiple fields. For example, bank invoice template 212 includes fields in the form of a table 212a with two columns and multiple rows, invoice 218 includes a graphics field containing a logo 218a, a text field containing numbers 218b, etc. Upon receipt of documents 210, in learning stage 220 each type of documents is processed in order for the system to learn from the markup of fields in these documents. One or more models maybe derived in the learning stage 220 for detecting fields in documents. In the input document field detection stage 230, the system processes an input document to detect the structure of the input document, detect the field(s) within the input document based on models derived in the learning state 220, and extracts fields with its contents.

Figure 3:
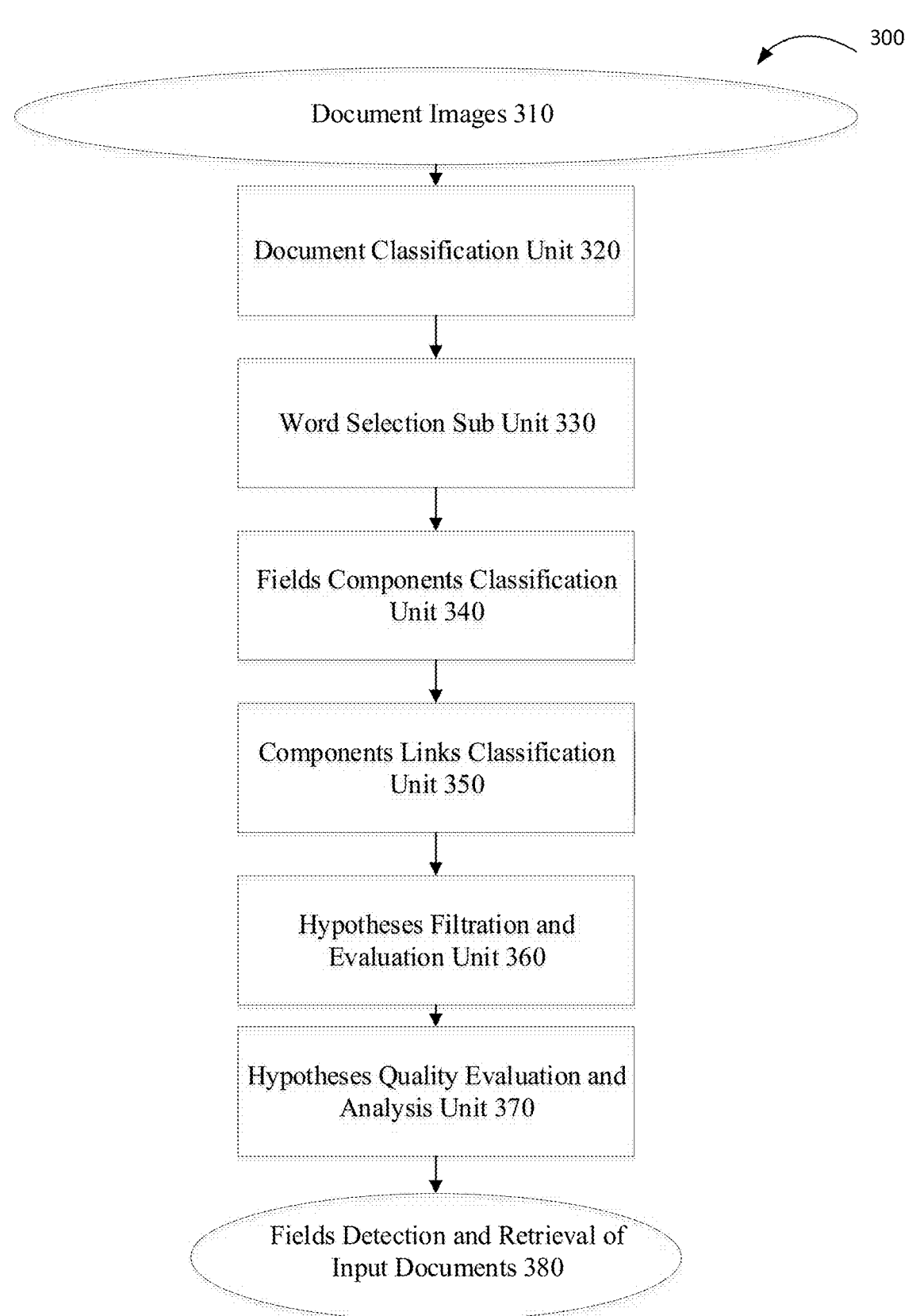
FIG. 3 depicts a block diagram of various components of an example system for field detection in a document, in accordance with one or more aspects of the present disclosure.

FIG. 3 depicts a block diagram of various components of an example system 300 for field detection in a document, in accordance with one or more aspects of the present disclosure. In some implementations, a user, such as a human user or a computer system user, can identify a small number of documents containing one or more fields. The user can identify each type of document on which field detection is performed using the system 300. In an implementation, the user can markup fields on the identified documents. To markup a field, a user can draw lines, circles, boxes, rectangles or other shapes, highlight, or otherwise create markings on or surrounding a portion of a document to designate the area as the identified field. The user can markup multiple fields that needs to be trained for detection on each document, such as fields for "Total" and "Address." In addition, the user markup can also include identification of the marked up fields (e.g., "Date," "Total," etc.). A "small number," as used herein, can represent 3-5 documents, for example. In an example, no more than ten documents of a specific type are marked up by a user. The user can markup all fields in the document, or mark selective fields on the document. Each field is identified and marked independently of other fields on the document.

In some implementations, the user can then upload the identified documents to the system 300 as electronic documents. Electronic documents can be scanned images, photographed images, or any other representation of a document that is capable of being converted into a data form accessible to a computer. The uploaded documents are referred to herein as document images 310. In an implementation, the user can upload documents that already include marked-up fields. In another implementation, the user can electronically markup the document images 310 using a user interface of the system 300. For example, using a user interface, the user can indicate (e.g., by clicking on, dragging on, or using other gestures, etc.) the portion of a document comprising required word, numbers, etc. and further the system can mark up surrounding boundaries of the field automatically. In some implementations, received documents can be automatically grouped into various preliminary clusters such that each cluster has similar documents, which in turn can help the user to mark up the fields correctly. System 300 associates each document image of document images 310 with a metadata identifying a particular document field based on the markup in the document image. In some examples, the metadata identifies a document field containing a variable text. In some implementations, system 300 categorizes each document image 310 into a particular document class using document classification unit 320. For example, the document images may be classified into a particular class based on similarity of document attributes. In one example, document images may be classified based on vendor name associated with the document. For each class, a small selection of document images (e.g., 2-6 document images) are collected in system 300.

In some implementations, the word selection sub unit 330 of system 300 is a submodule that uses a heuristic algorithm to analyze document text. The text can be analyzed for selection of words on document layout based on character types, such as letters, numerals, separators, etc. Heuristics can involve problem-solving by experimental and/or trial-and-error methods A typical heuristic algorithm is derived by using some function that is included in a system for searching a solution, often using decision trees. The algorithm can include steps for adjusting weights of branches of the decision tree based on the likelihood of a branch to lead to the ultimate goal node. Here, heuristics can be used to separate lines of text into groups of same type of characters. In an example, a cascade classification of text fragments in a document can be represented using a graph. The text fragments are nodes of the graph. The nodes of the graph are joined by edges (logical links between the text fragments). The graph can be analyzed and modified to further break down text fragments that were initially identified in each node. For example, a text fragment containing both letters and numbers can be split into two new nodes to separate the letters from the numbers. In an implementation, unit 330 obtains text from the document image 310 and splits the document text into continuous subsequences of characters. The character subsequences may belong to the same character type. For example, the character types can include letters, numbers, and separators. The sub unit 330 can separate the text into individual words. The sub unit 330 can obtain all possible words in the document image 310.

In some implementations, system 300 uses fields component classification unit 340 to classify each word of the document image 310 based on the likelihood of the word to be included within a particular field. In some implementations, reference elements on a document image are used to define the location of a document field. Any structural element that belongs to the document layout can be used as reference element. A reference element can include a pre-defined word (e.g., keyword), a predefined graphical element (e.g., a visual divider, a logo) etc. In some implementations, a set of reference elements can be obtained using the training sample of document images. In some examples, a specific dictionary of "frequency words" can be formed based on the training documents. Frequency words are list of words grouped by frequency of occurrence within a corpus of documents (e.g., the training sample documents). In an example, the frequency words can be grouped as a ranked list. In some examples, reference elements on the document images can be identified by matching the frequency words that appear on one or more document images with a frequency that exceeds a predefined threshold frequency. In some examples, reference elements can be identified using custom dictionaries of words, various word-character separators, stamps, and other pre-defined text and/or visual elements in the document image.

A reference element can act as a focus point with respect to which the location of a document field is defined. The center of a rectangular area that encompasses the frequency word on a document image, for example, can be identified as the location of the reference element in that document image. In other examples, any other location respective to the reference element can be designated as the location of the reference element. In the example of FIG. 2, a location (e.g., center) of rectangular area 218*c* surrounding the word "total" in the document 218 can be used as the location of the reference element "total."

In some implementations, a document field's location (also referred to herein as "field region") can be identified relative to the reference element. In the example of FIG. 2, a document field location (e.g., location of numbers 218*b*) corresponding to the reference element "total" can be identified relative to the location of the reference element "total" in the document. For each document image in the training set of document images (e.g., document images 310), the location of the document field can be obtained based on the markup of the training sample document image. In an implementation, system 300 associates metadata with a particular document field based on the user markup on the document. The metadata can define the location of the document field relative to the reference element. For example, the metadata for a particular marked up document image can indicate that the location of a document field is 50 pixels to the right from the location of the reference element on the document image. The document field location can be expressed in terms of a range of locations, number of pixels, etc. The document field location can include a region on the document image. A region can be an area within the document image. A region can have a specific geometric shape, but not limited to, for example, a rectangle, quadrilateral, ellipse, circle, other polygon, etc. The document field location can refer to a region on the document image contained within the document field.

In some implementations, a heat map is used to determine the likelihood of a word in the document image to be included in a particular field. For each given field in the training data set, a heat map can be generated with respect to each reference element. "Heat map" refers to a set of numeric elements, such that the value of each element is defined by a certain function computed at the image coordinates reflecting the position of the element. In some implementations, the heat map may be represented by a rectangular matrix, such as a table, a grid, etc. Each element of the heat map corresponds to a certain pixel in the vicinity of a reference element, such that the value associated with each pixel reflects the number of training documents in which the given field contains this pixel. Different data structures can be used to represent a heat map. For example, a heat map can be represented using histograms, charts, tables with cells, graphs, plots, etc. A heat map is a data visualization technique that shows magnitude of a phenomenon using color in two dimensions. The numeric values of heat map elements can be color coded for visualization (hence, the term), however, this step would be superfluous for neural network training, in which the numeric values, rather than colors, are used.

In some implementations, a heat map can be generated for each reference element in the set of training document images 310. The heat map is generated using the location of a document field relative to the reference element based on the metadata for the training document images. For example, a location for a document field can be represented by particular pixels on the image included within a box surrounding the document field, as identified by the markup on the document image. The heat map is represented by a data structure that includes a plurality of heat map elements. For example, a heat map can be created by dividing an image into a rectangular grid with specified cell size in pixels. In this example, the grid represents the heat map data structure and the cells represents the heat map elements. The image used for the heat map can correspond to each of the training document images, and each of the plurality of heat map elements can correspond to each of a number of document image pixels of the corresponding training document image. In an example, for each pair of reference element and document field location in the training set of document images, the cell is filled with a value that equals to the fraction of the area occupied by the region for the document field contained within the cell.

In an implementation, for a chosen reference element for which a heat map is being built, a relative location of a field corresponding the reference element is determined in each of the training document images. For example, in a hypothetic first training document image, a numeric value "$1000" can be found 50 pixels to the right of the location of the reference element "total." For the heat map data structure for the reference element "total," it is determined whether each document image pixel in the first image corresponding to each heat map element (e.g., a cell) is included into a document field location as identified by the markup on the document image. If any document image pixel is fully contained within the document field location (e.g., the region covered by the document field), the heat map element corresponding to that document image pixel is assigned a value of "1." For example, the value of a cell is set to "1" when the cell corresponds to an image pixel in the document that is contained into the marked up portion of the document image covering the region for "$1000." The value of a cell is set to "0" when it corresponds to an image pixel in the document that is not occupied by the field region "$1000." In one implementation, the value set in the cell indicates the number of document images in which the field contains a pixel corresponding to the heat map element. Thus, the heat map element stores a counter of the number of document images in which the document field contains a document image pixel associated with the heat map element.

System 300 continues to update the heat map for the chosen reference element using the next document image in the training set of document images. Values of the heat map elements are updated to add the new values reflecting the next document image. For example, if the value of a particular cell in the heat map was already set to "1," and the cell corresponds to an image pixel in the next document that is contained within the field region "$1000," then the value of the cell is incremented by a value of "1," to equal to a value of "2." System 300 continues to aggregate the values of the heat map element for each of the document images in the training set of document images to identify the image pixels contained within a particular document field. In some implementations, the final histogram of the relative location for the selected reference element is considered to be the arithmetic mean of values in respective cells of the heat maps.

In some implementations, system 300 can update the heat map for the chosen reference element to include heat map element values that relate to another document field. That is, for the chosen reference element for which the heat map is being built, the location of a different field is identified from all of the training document images. The location is identified relative to the chosen reference element for the heat map. For example, a location of the "invoice date" filed relative to the reference element "total" can be identified in the heat map, by setting the value of the heat map elements to "1" where the heat map elements correspond to the image pixels that are contained in the "invoice date" field in a first training image. Similarly, values of the heat map elements are aggregated for each additional document image in the training set for the location of "invoice date" field relative to the reference element "total." Thus, a heat map for a chosen reference element can identify potential locations of each field of the document with respect to the chosen reference element. Accordingly, the training phase may involve generating the heat maps of a relatively small set of training documents that are accompanied by metadata indicating the locations of the document fields. The generated heat maps may later be used for identifying the field locations in other documents.

Figure 4A:
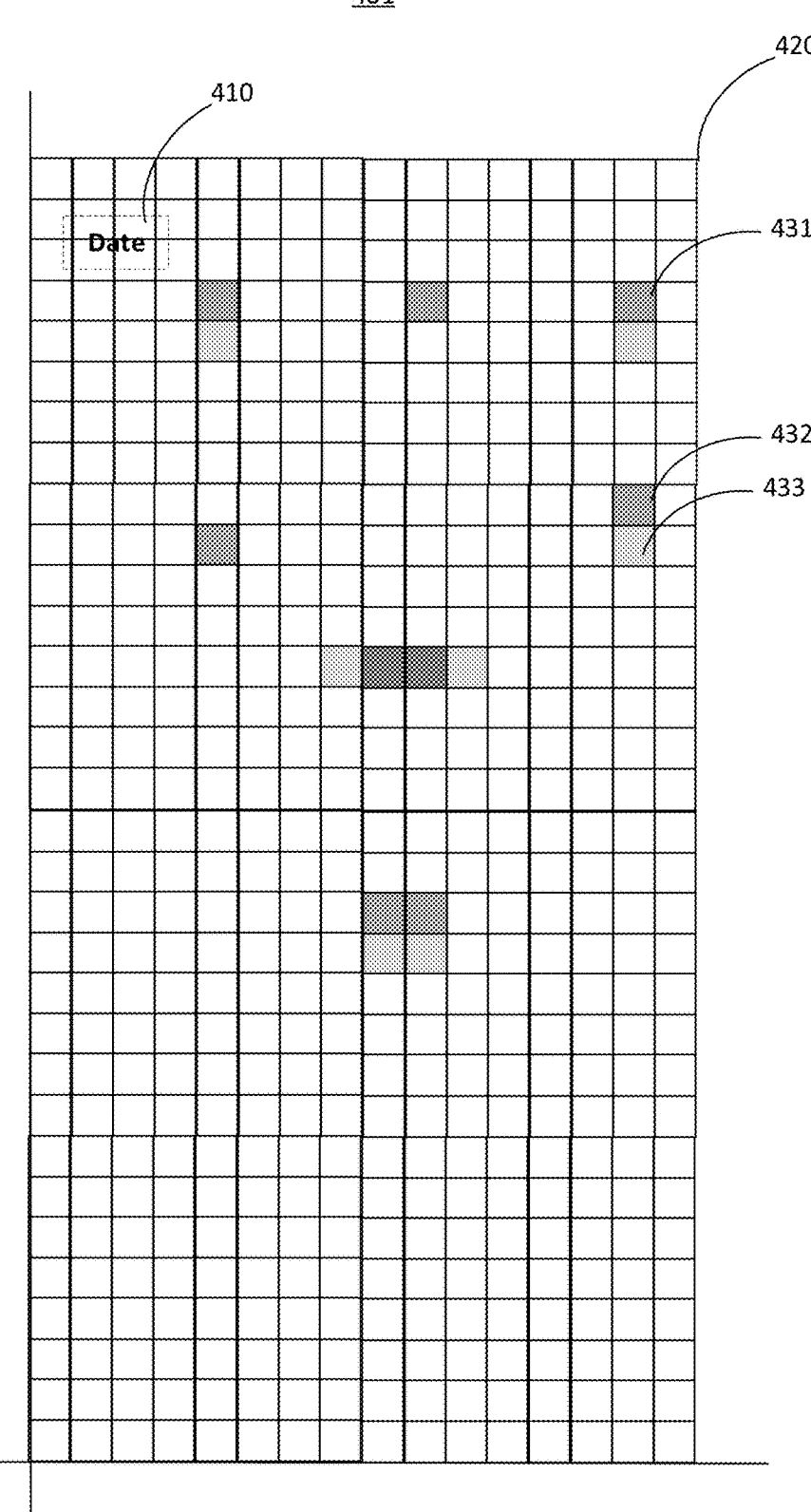
FIGS. 4A-4B depict examples of heat maps used in performing field detection in a document, in accordance with one or more aspects of the present disclosure.
Figure 4B:
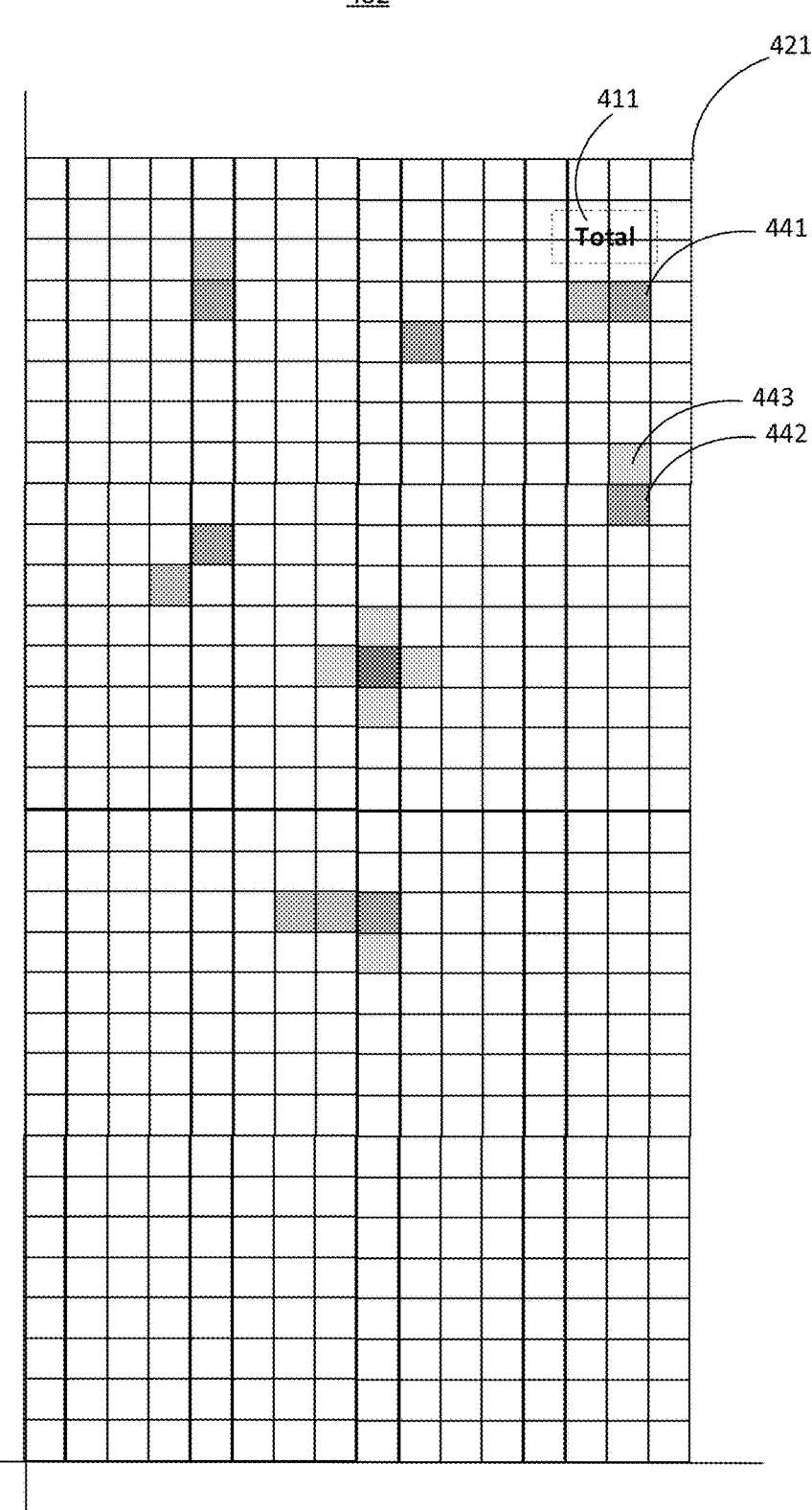

FIG. 4A shows an example heat map 401 for a chosen reference element. The reference element 410 is a predefined keyword "Date" that is found in the training set of document images. Heat map 401 identifies locations of various document fields relative to element 410. Reference element 410 is shown with dotted lines because the reference element is not part of the grid data structure 420 that represents the heat map 401. Rather, the reference element 410 represents the location on the grid that corresponds to the location of the keyword "date" on the training set of document images. Heat map elements, such as cells 431 and 432, correspond to image pixels in the training document images in which are contained within various document fields. In an example, cell 432 is shown to be darker in color than cell 433, which indicates that the counter for cell 432 has a higher value than the counter for cell 433, which in turn indicates that a higher number of document images have image pixels corresponding to cell 432 contained within the respective field than cell 433. Similarly, FIG. 4B shows an example heat map 402 for a chosen reference element 411 with the keyword "Total" and locations of various fields identified with respect to reference element 411 indicated by the shaded cells. In this example, cell 442 is shown to be darker than cell 443. FIGS. 4A and 4B shows a grid data structure being used for the heat maps depicted therein. In an example, the grid size is a hyperparameter, such as 64×64 pixels. The hyperparameter also be of a different value, such as 32×32 px, 16×16 px, etc. The hyperparameter can be selected from values that depend on, for example, the document itself (number of marked-up fields, text size, etc.), document layout, etc.

In some implementations, system 300 uses heat map attributes to classify each possible word found in the document images 310 for the likelihood of the word to be contained in a particular field region. Classification is made into positive and negative examples. Positive examples are words that are included in the particular field region as defined by the field coordinates (e.g., x axis, y axis) in the document. Negative examples are all words that are not included in the particular field region. The locations of the particular field regions identified in the heat maps relative to the reference elements are used as localizing features of the hypothesis generated by the fields component classification unit 340. At the output of the unit 340, one or more sets of field component hypotheses are generated. The hypotheses can indicate a probable location of a document field within a document relative to a reference element. The probable location is determined based on the positive examples identified using the heat maps.

In some implementations, system 300 evaluates internal format of the extracted content of the identified fields in the training set of document images 310 using BPE (Byte Pair Encoding) tokens. BPE token refers to a numeric vector representing an input text. In some implementations, the vector can be represented by an embedding of an interim representation of the input text, such that the interim representation may utilize an artificial alphabet, each symbol of which can encode a substring of one or more characters of the input text, as described in more detail herein below. The embeddings are generated in such a manner that semantically close inputs would produce numerically close embeddings.

Figure 5:
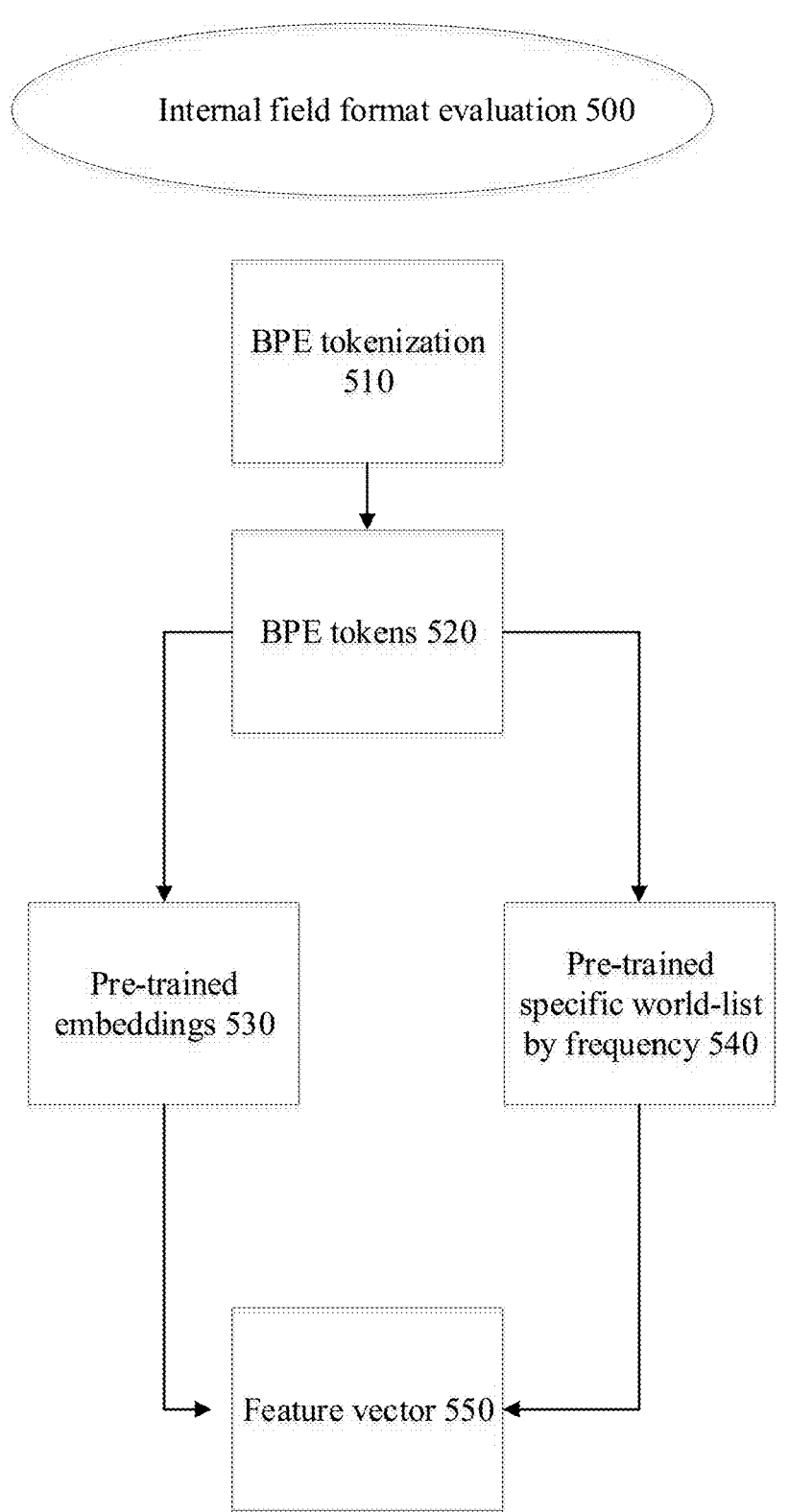
FIG. 5 depicts an illustrative example of internal field format evaluation, in accordance with one or more aspects of the present disclosure.

FIG. 5 depicts an illustrative example of internal field format evaluation 500, in accordance with one or more aspects of the present disclosure. In some implementations, to evaluate the internal format of the detected field, system 300 uses BPE tokens. In conventional systems, BPE tokens are usually used in natural language processing tasks. Aspects of the present disclosure uses BPE tokens for the evaluation of internal field format to more accurately and confidently detect document fields. Usage of BPE tokens for the evaluation results in a significant improvement in the field detection mechanism by increasing quality and speed of the field detection in documents.

In some implementations, as part of the internal field format evaluation 500, BPE tokenization 510 is used to obtain features describing the internal format of the content (e.g., variable text, words) of the detected fields on the document images. System 300 can use a mechanism for tokenizing strings multilingual dictionary of BPE tokens 520. Dictionary 520 can include pre-trained embeddings 530 and a dictionary of pre-trained specific word-list by frequency 540. Both embeddings 530 and dictionary 540 are pre-trained on the body of the text fields of an existing markup database. In an example, an arithmetic mean of embeddings is taken as the feature vector 550 of a text string of tokens included in the string.

In some implementations, the BPE tokens are used for the content of the detected fields in the training dataset (e.g., training document images). As noted above, an artificial alphabet of symbols can be derived for using as BPE tokens (e.g., encodings). The alphabet includes individual characters and tokens of two characters, three characters, etc. In an example, the alphabet can include a thousand or more symbols representing different combinations of characters. Each word, or characters in the word, in the training document images can be represented using symbols from the derived alphabet representing the word, or the characters, to derive tokenized content. BPE embeddings, which are vector representation of the BPE tokens, are then derived. Words in the set of training documents that are semantically closer to each other (e.g., "1000" and "2000") would produce numerically close embeddings (e.g., Euclidian distance between the two vectors are less than a predefined value). For example, in one document the "total" field may contain "1000" and in another document the "total" field may contain "2000." When applying the BPE tokens to these values, the BPE embeddings would be close to each other. As a result, it can be confirmed that the values are correctly identified as the content of the "total" field. When the system processes an input document for detecting fields, an aggregate (e.g., mean, average, etc.) value of the BPE tokens for the values "1000" and "2000" of the training document is taken in consideration for comparison with values in the detected fields of the input document. If a detected field contains a value (e.g., "2500") whose BPE embedding is close to the aggregate value of the BPE in the training documents, the field detection can be confirmed with higher confidence. A threshold range can be defined in order to determine whether a value in the input document is close to the aggregate value. Additionally, if a detected field contains multiple words, BPE tokens can be used in a similar way to compare with the reference embedding for the detected field.

Referring back to FIG. 3, in some implementations, system 300 applies component links classification unit 350 to the resulting hypotheses from unit 340. For each pair of components (e.g., words), unit 350 calculates an estimate of the pair's joint membership in the hypothesized field of the document. For example, a hypothesized field may include multiple words, such as, an address field that includes a street number, street name, city, state, country, etc. Additionally, the possible locations of the fields identified in the heat maps can include multiple words. Accordingly, each hypotheses includes a sequence of one or more words from the multiple words matching the locations of the field.

In some implementations, system 300 applies hypotheses filtration and evaluation unit 360 to the resulting data from unit 350. Unit 360 uses additional field properties for filtering and evaluation of hypotheses obtained from unit 350. For example, additional properties can include multi-page indicator (e.g., to indicate a field is on more than one page of the document), one-sided indicator (e.g., to indicate that content is only on one side of the document), two-sided indicator (e.g., to indicate that content is on both sides of the document) maximum and minimum geometric field size, and other attributes, either alone or in combination. In an implementation, the parameters can be set by a user of the system 300. For example, the user can set a parameter for the content of a field to be multi-line or single line. In an example, the user can set a parameter to indicate that a "date" or "total" field in an invoice document can only be a single-line. In another implementation, the system 300 can set a parameter associated with a type of document. For example, the system 300 can set parameters such as geometric field parameters, threshold values, etc. These parameters can be defined based on a heuristic method. A typical heuristic algorithm is derived by using some function that is included in a system for searching a solution, often using decision trees. The algorithm can include steps for adjusting weights of branches of the decision tree based on the likelihood of a branch to lead to the ultimate goal node. Various combinations of parameters or methods can also be used in system 300. Moreover, system 300 can use linear classifiers based on logistic regression (e.g., trained classifiers based on gradient boosting) as the component classifier and the hypothesis classifier for the document field.

In some implementations, system 300 uses hypotheses quality evaluation and analysis unit 370 to evaluate the overall quality of the obtained hypotheses. In some examples, the hypotheses are obtained from unit 360. In other examples, the hypotheses may be obtained from another unit of system 300. Various threshold may be defined in the system to assess the quality of the hypotheses. For example, a set of words can be identified as being in a "confident" group when the probability of the set of words of belonging to a field at the classification output is higher than a specified threshold. For example, a specified threshold can be 0.5, 0.4, or another value that has been determined by an expert method such as test sample document evaluation, or a value that is a single pre-set hyperparameter (e.g., a parameter that is derived from a prior distribution).

Hypothesis quality evaluation can involve identifying a "confident" word and words that are "reliably" linked to the confident word. A starting component from the hypotheses is selected for evaluation and a search area around the hypotheses is selected for limiting a search for other words. For example, one or more "confident" words are selected to start building one or more hypotheses. The search area is considered to be a rectangle describing the word with borders that fall behind the distance of a defined maximum field size from the borders of the starting component. Then a "confident chain" of hypotheses is assembled by including all words "reliably" associated with the starting component that lie within the search area. Then a final one or more hypotheses are assembled and evaluated, which include all words from the search area that are "reliably" associated with all components of the "confident chain." Whether the words are "reliably" associated can be determined using a heuristically configurable threshold, for example, identifying what value above the configured threshold is accepted as reliably linked, what value below the specified threshold is accepted as an unreliable link, etc. For example, the specified threshold can be obtained by training a large sample of data received from the client by a suitable machine learning method and by testing its value by cross validation or other suitable method. Additionally, further analysis of the documents can be performed by comparing the fields of the hypothesis having the highest quality to other hypotheses.

Figure 6:
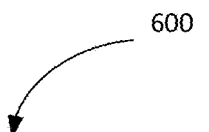
FIG. 6 depicts an illustrative example of a documents with detected fields, in accordance with one or more aspects of the present disclosure.

In some implementations, system 300 uses the field detection and retrieval unit 380 to detect and classify fields on other input document(s) 380. System 300 may detect fields according to the selected hypotheses of potential fields with a quality value that meets a defined quality threshold and/or obtained analysis results on internal format of the content within the potential fields. For example, when system 300 receives an input document 380 for field detection and retrieval, system 300 can detect fields on the input document 380, classify the fields, and extract content within the detected fields. In some examples, system 300 can automatically upload the document image with the detected fields and retrieved content to a data store, and/or a software portal. FIG. 6 depicts an illustrative example of an input document 600 with detected fields 610, in accordance with one or more aspects of the present disclosure. System 300 detects the fields 610 based on the hypotheses derived using the training set of document images.

Referring back to FIG. 3, in some implementations, system 300 may receive an input document image and may identify, within the input document image, a candidate region for each field of interest based on the heat maps built for this field with respect to one or more reference elements. Each identified candidate region would include the input document image pixels corresponding to heat map elements satisfying a threshold condition (e.g., having their respective values exceeding a threshold, selecting a pre-defined share of pixels having the largest values, etc.). The selected candidate regions may then be treated as the positions of the corresponding fields, i.e., by applying OCR techniques to the image fragments lying within the candidate regions.

In some examples, two or more heat maps can be used for detection of the fields where each heat map is built for a different reference element. For example, to detect a location of a specific field (e.g., field corresponding to "Invoice #" reference element, referred to as "Invoice #" field hereinafter) on a new input document image 380, keywords from the document image are first identified using a dictionary of keywords. For example, identified keywords can include "Date," "Total," "Balance Due," "Due Date," etc. System 300 selects the heat maps for each of the keywords and identifies the probable position for the specific field within the document image. For example, system 300 selects a heat map for reference element "Date," and identifies the probable position of the specific field (e.g., "Invoice #" field) relative to the reference element "Date." The probable position of the field is obtained based on the hypotheses generated based on the values of heat map elements being above threshold values. Similarly, system 300 selects a heat map for reference element "Total," and identifies the probable position of the specific field (e.g., "Invoice #" field) relative to the reference element "Total,", and so on, for heat maps for the different keywords found in the input document. System 300 then compares the heat maps, and identifies intersection of the probable spots identified using the different heat maps. System 300 selects one or more spots on the input document which correspond to the maximum number of intersecting heat maps and defines the region including the spots as the candidate region for the specific field (e.g., "Invoice #" field) on the input document image. A threshold number can be specified for the number of intersecting spots. If the number of intersecting spots on the heat maps meet or exceed the threshold number, the spots area selected to be included in the candidate region. Accordingly, the candidate region is detected to be the specific field on the input document.

In some implementations, content extracted from each detected document field can be evaluated using BPE tokens, by evaluating the differences (e.g., Euclidian distances) between the BPE token representing the extracted content of a given field of the input document and the BPE tokens computed for the same field in the training documents. If the computed distance between the BPE token representing the content extracted from a candidate field and the aggregate (e.g., mean, average) of the BPE token(s) representing the same field in the training data set is less than a threshold, the likelihood that the field is detected correctly is relatively high, and the candidate field may be accepted for information extraction.

In some implementations, outputs of various modules can be connected for a priori document analysis (e.g., documents of such types as invoices, tables, receipts, key-value, etc.). Custom rules can also be used that describe knowledge about the nature of the input document (for example, country code, page number, and the like).

In some implementations, after receiving a large set of documents (e.g., several thousand documents), system 300 can repeat the training process but with errors identified in the field detection process. This can further improve the quality of the field detection.

In some implementations, system 3400 can determine the accuracy of the user markup on the training documents and correct any inaccuracy that is detected. Documents with custom field markup are received as training input. The markup in the batch can be complete (correct), partial, inconsistent (the same fields are marked in different places), erroneous. These markup represents exactly the markup that the user performed. For each marked field, possible stable combinations of the relative position of other fields are detected based on the markup of other fields, the search for these fields by the system, and various keywords (frequency words that are included in the field region). The relative position of fields can be determined by the absolute location (e.g., as it relates to the document the field is on, such as a line number or pixel identification on the document) or relative location (e.g., as compared to a particular element on the document, such as, a "total" field being to the right of the "date" field by 100 pixels), or the zone (e.g., range) of acceptable location (distribution) of certain fields or keywords (e.g., an indication that a "client number" field must always be to the left of the "client name" field and no further than 100 pixels away, otherwise it is considered to be not a value for the field). The fields for which there are stable combinations of other fields and keywords, and for which these combinations are repeated or correlated from document to document, are considered stable and probably correctly marked. Fields for which no stable regularities are found are considered either incorrectly marked or singly marked. Fields of the same type (for example, "total") with different stable structures or combinations on different sets of documents are considered either inconsistent (if documents of the same cluster or vendor) or reveal heterogeneity of the documents on which they are located. Thus, the system can verify the correctness of the received markup and predict markup with a high confidence level when the system is first started with a small number of documents necessary for starting the training of the system, assuming that the system contains a universal pre-trained markup machine learning model containing standard rules regarding the intended types of user documents. Further, when collecting user markup statistics, the model is trained on user documents in the opposite direction, knowing stable combinations of fields and keywords, the system can identify areas of possible location of unmarked fields or incorrectly marked fields and give the user hints. For example, the system can provide hints on how to mark up a particular document correctly, or upload a selection of documents where the markup is clearly incorrect and needs to be corrected.

FIG. 7 depicts a flow diagram of one illustrative example of a method for segmentation of a document into blocks of various types, in accordance with one or more aspects of the present disclosure. Method 700 and/or each of its individual functions, routines, subroutines, or operations may be performed by one or more processors of the computer system (e.g., example computer system 800 of FIG. 8) executing the method. In certain implementations, method 700 may be performed by a single processing thread. Alternatively, method 700 may be performed by two or more processing threads, each thread executing one or more individual functions, routines, subroutines, or operations of the method. In an illustrative example, the processing threads implementing method 700 may be synchronized (e.g., using semaphores, critical sections, and/or other thread synchronization mechanisms). Alternatively, the processing threads implementing method 700 may be executed asynchronously with respect to each other. Therefore, while FIG. 7 and the associated description lists the operations of method 700 in certain order, various implementations of the method may perform at least some of the described operations in parallel and/or in arbitrary selected orders. In one implementation, the method 700 may be performed by one or more of the various components of FIG. 1, such as, field detection engine 122, field training engine 151, etc.

At block 710, the computer system implementing the method may receive a training data set. The training data set may comprise a plurality of document images. Each document image of the plurality of document images may be associated with respective metadata identifying a document field. The document field may contain characters, such as, a variable text. For each document image of the plurality of document images, the metadata may identify a marked up document field location corresponding to the document field.

At block 720, the computer system may generate a first heat map. The heat map may be represented by a data structure (e.g., a grid, a plot, etc.). The data structure may include a plurality of heat map elements (e.g., cells) corresponding to a plurality of document image pixels. In some examples, each heat map element stores a counter. The counter may indicate a number of document images in which the document field contains a document image pixel associated with the heat map element.

At block 730, the computer system may receive an input document image. At block 740, the computer system may identify a candidate region within the input document image. The candidate image may comprise the document field. In some examples, the candidate region comprises a plurality of input document image pixels. In some examples, the input document image pixels correspond to heat map elements satisfying a threshold condition.

In some examples, the candidate region is identified using a plurality of heat maps. The plurality of heat maps may comprise the first heat map and one or more additional heat maps. Each of the plurality of heat maps identify a potential document field location corresponding to the document field. Each of the plurality of heat maps identify the potential document field location relative to a respective reference element in each of the plurality of heat maps. In some examples, the respective reference element comprises a predefined word (e.g., a keyword such as "Date"), or a predefined graphical element (e.g., a visual divider, a logo, etc.).

Additionally, in the training stage, the computer system may extract a content of each taining document image where the content is included in the potential document field location (e.g., a content "1000," "2000," and "1500," respectively, in each document where the content is contained within a potential location for a "total" field). The computer system may then analyze the content of each document image using Byte Pair Encoding (BPE) tokens. In an implementation, to analyze the content, the computer system may represent the content of each document image using BPE tokens to derive tokenized content for each document image. The computer system may generate vector representation (e.g., BPE embeddings) of the tokenized content for each document image. The computer system may calculate a distance (e.g., a Euclidian distance) between a pair of embeddings (e.g., embeddings representing "1000" and "2000") from two document images of the plurality of document images. If it is determined that distance is less than a predefined value, the computer system indicates that the potential document field location is likely to be correct. In the input document field detection stage, when a candidate field is detected (e.g., "total") on an input document using the trained model, the content (e.g., "2899") of the detected field can be extracted, and the BPE embeddings of the extracted content can be generated. An aggregate value of the BPE embeddings of the content (e.g., the content "1000," "2000," and "1500" in the training documents) of the field in the set of training documents can be calculated. If the computed distance between the BPE token representing the content extracted from the detected field on the input document and the aggregate BPE token(s) representing the same field in the training data set is less than a threshold, then the likelihood that the field is detected correctly is relatively high, and the candidate field may be accepted as the detected field and selected for information extraction.

Figure 8:
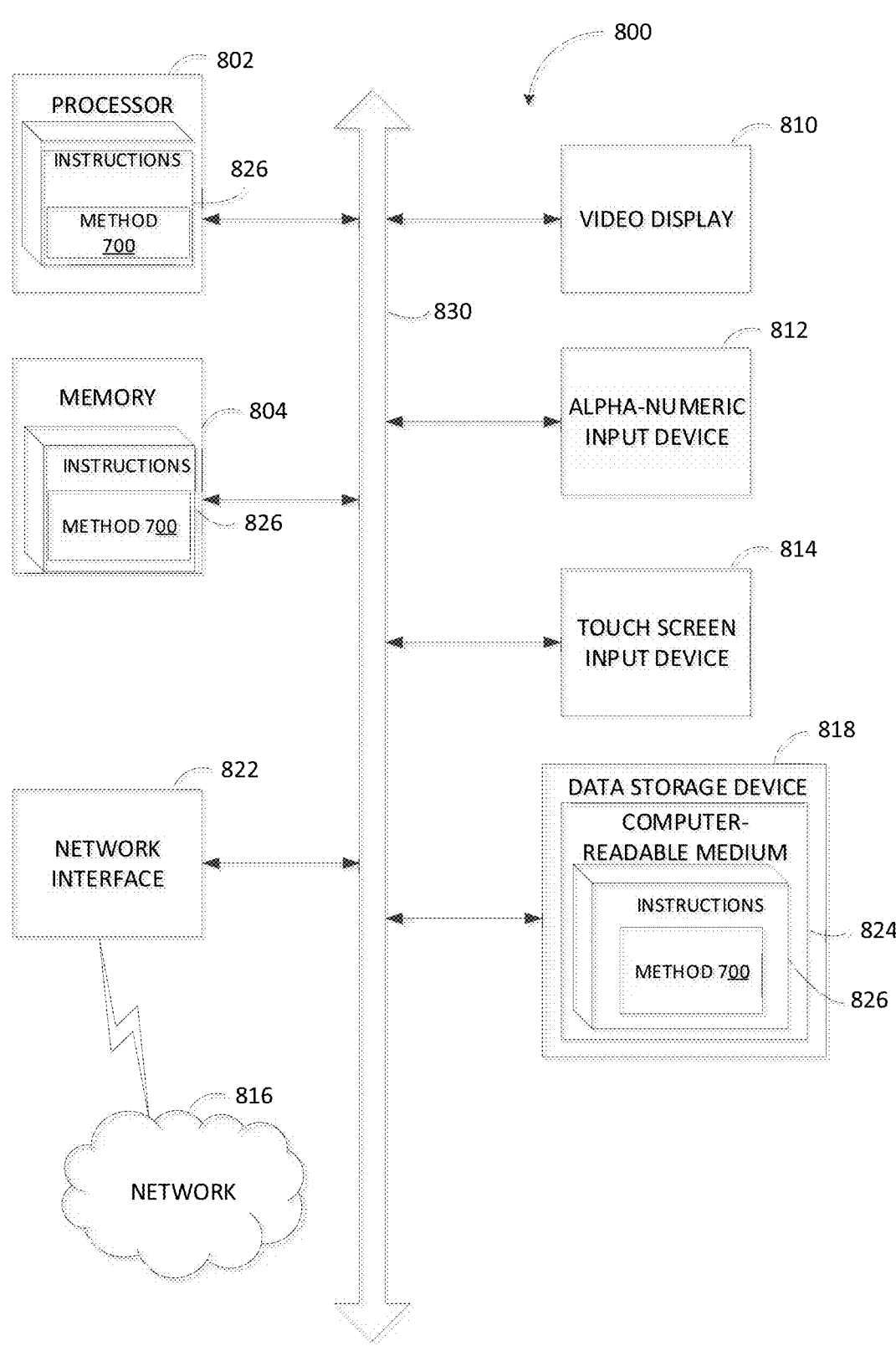
FIG. 8 depicts an example computer system which can perform any one or more of the methods described herein, in accordance with one or more aspects of the present disclosure.

FIG. 8 depicts an example computer system 800 which can perform any one or more of the methods described herein, in accordance with one or more aspects of the present disclosure. In one example, computer system 800 may correspond to a computing device capable of performing method 700 of FIG. 7. The computer system 800 may be connected (e.g., networked) to other computer systems in a LAN, an intranet, an extranet, or the Internet. The computer system 800 may operate in the capacity of a server in a client-server network environment. The computer system 800 may be a personal computer (PC), a tablet computer, a set-top box (STB), a personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 800 includes a processing device 802, a memory 804 (e.g., read-only memory (ROM), flash memory, dynamic random access memory (DRAM) such as synchronous DRAM (SDRAM)), and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute instructions for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814

(e.g., a mouse), and a signal generation device 816 (e.g., a network). In one illustrative example, the video display unit 810, the alphanumeric input device 812, and the cursor control device 814 may be combined into a single component or device (e.g., an LCD touch screen).

The data storage device 818 may include a computer-readable medium 824 on which the instructions 826 embodying any one or more of the methodologies or functions described herein is stored. The instructions 826 may also reside, completely or at least partially, within the memory 804 and/or within the processing device 802 during execution thereof by the computer system 800, the memory 804 and the processing device 802 also constituting computer-readable media. The instructions 826 may further be transmitted or received over a network via the network interface device 822.

While the computer-readable storage medium 824 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:

receiving a plurality of document images, wherein each document image of the plurality of document images comprises a corresponding document field containing a variable text;

generating, by processing the plurality of document images, a first heat map represented by a data structure comprising a plurality of heat map elements corresponding to a plurality of document image pixels, wherein each heat map element stores a respective value specifying whether the corresponding document field contains a document image pixel associated with the heat map element;

receiving an input document image; and identifying, using the first heat map, a candidate region of the input document image, the candidate region comprising the document field, wherein the candidate region comprises a plurality of input document image pixels corresponding to heat map elements satisfying a threshold condition.

2. The method of claim 1, wherein the candidate region is identified using a plurality of heat maps, the plurality of heat maps comprising the first heat map and one or more additional heat maps, wherein the each of the plurality of heat maps identify a potential document field location corresponding to the document field.

3. The method of claim 2, wherein each of the plurality of heat maps identify the potential document field location relative to a respective reference element in each of the plurality of heat maps.

4. The method of claim 3, wherein the respective reference element comprises one or more of a predefined word, or a predefined graphical element.

5. The method of claim 2, further comprising:

extracting a content of each document image of the plurality of document images, wherein the content is included in the potential document field location; and analyzing the content of each document image using Byte Pair Encoding (BPE) tokens.

6. The method of claim 5, wherein analyzing the content comprises:

representing the content of each document image using BPE tokens to derive tokenized content for each document image;

generating vector representation of the tokenized content for each document image;

calculating a distance between a pair of vector representations of the tokenized content from two document images of the plurality of document images; and in response to determining that the distance is less than a predefined value, indicating that the potential document field location is likely to be correct.

7. The method of claim 1, wherein each document image of the plurality of document images is associated with respective metadata defining a marked up document field location corresponding to the document field for each document image of the plurality of document images.

8. A system comprising:

a memory device storing instructions;

a processing device coupled to the memory device, the processing device to execute the instructions to:

receive a plurality of document images, wherein each document image of the plurality of document images comprises a corresponding document field containing a variable text;

generate, by processing the plurality of document images, a first heat map represented by a data structure comprising a plurality of heat map elements corresponding to a plurality of document image pixels, wherein each heat map element stores a respective value specifying whether the corresponding document field contains a document image pixel associated with the heat map element;

receive an input document image; and identify, using the first heat map, a candidate region of the input document image, the candidate region comprising the document field, wherein the candidate region comprises a plurality of input document image pixels corresponding to heat map elements satisfying a threshold condition.

9. The system of claim 8, wherein the candidate region is identified using a plurality of heat maps, the plurality of heat maps comprising the first heat map and one or more additional heat maps, wherein the each of the plurality of heat maps identify a potential document field location corresponding to the document field.

10. The system of claim 9, wherein each of the plurality of heat maps identify the potential document field location relative to a respective reference element in each of the plurality of heat maps.

11. The system of claim 10, wherein the respective reference element comprises one or more of a predefined word, or a predefined graphical element.

12. The system of claim 9, wherein the processing device is further to:

extract a content of each document image of the plurality of document images, wherein the content is included in the potential document field location; and analyze the content of each document image using Byte Pair Encoding (BPE) tokens.

13. The system of claim 12, wherein to analyze the content, the processing device is to:

represent the content of each document image using BPE tokens to derive tokenized content for each document image;

generate vector representation of the tokenized content for each document image;

calculate a distance between a pair of vector representations of the tokenized content from two document images of the plurality of document images; and in response to a determination that the distance is less than a predefined value, indicate that the potential document field location is likely to be correct.

14. The system of claim 8, wherein each document image of the plurality of document images is associated with respective metadata defining a marked up document field location corresponding to the document field for each document image of the plurality of document images.

15. A non-transitory computer-readable storage medium comprising instructions that, when executed by a processing device, cause the processing device to:

receive a plurality of document images, wherein each document image of the plurality of document images comprises a corresponding document field containing a variable text;

generate, by processing the plurality of document images, a first heat map represented by a data structure comprising a plurality of heat map elements corresponding to a plurality of document image pixels, wherein each heat map element stores a respective value specifying whether the corresponding document field contains a document image pixel associated with the heat map element;

receive an input document image; and identify, using the first heat map, a candidate region of the input document image, the candidate region comprising the document field, wherein the candidate region comprises a plurality of input document image pixels corresponding to heat map elements satisfying a threshold condition.

16. The non-transitory computer-readable storage medium of claim 15, wherein the candidate region is identified using a plurality of heat maps, the plurality of heat maps comprising the first heat map and one or more additional heat maps, wherein the each of the plurality of heat maps identify a potential document field location corresponding to the document field.

17. The non-transitory computer-readable storage medium of claim 16, wherein each of the plurality of heat maps identify the potential document field location relative to a respective reference element in each of the plurality of heat maps.

18. The non-transitory computer-readable storage medium of claim 17, wherein the respective reference element comprises one or more of a predefined word, or a predefined graphical element.

19. The non-transitory computer-readable storage medium of claim 16, wherein the processing device is further to:

extract a content of each document image of the plurality of document images, wherein the content is included in the potential document field location; and analyze the content of each document image using Byte Pair Encoding (BPE) tokens.

20. The non-transitory computer-readable storage medium of claim 15, wherein each document image of the plurality of document images is associated with respective metadata defining a marked up document field location corresponding to the document field for each document image of the plurality of document images.

* * * * *